United States Patent [19]

Sand

[11] Patent Number: 5,775,565

[45] Date of Patent: Jul. 7, 1998

[54] APPARATUS FOR FEEDING ONE OR MORE FIBRE THREADS

[75] Inventor: Kjell Sand, Västra Frölunda, Sweden

[73] Assignee: Aplicator System AB, Sweden

[21] Appl. No.: 776,462

[22] PCT Filed: Jul. 11, 1995

[86] PCT No.: PCT/SE95/00841

§ 371 Date: Jan. 21, 1997

§ 102(e) Date: Jan. 21, 1997

[87] PCT Pub. No.: WO96/02474

PCT Pub. Date: Feb. 1, 1996

[30] Foreign Application Priority Data

Jul. 18, 1994 [SE] Sweden .................. 9402519

[51] Int. Cl.$^6$ ..................................... B65H 20/00
[52] U.S. Cl. ........................... 226/187; 226/186
[58] Field of Search ..................... 226/187, 183, 226/193, 186; 19/258, 293; 271/271–274; 492/22, 30, 31, 33

[56] References Cited

U.S. PATENT DOCUMENTS

| | | | |
|---|---|---|---|
| 1,589,595 | 6/1926 | Hitchcock | 226/193 X |
| 2,260,128 | 10/1941 | Walter | 226/187 X |
| 2,274,834 | 3/1942 | Ira | 226/187 |
| 2,830,810 | 5/1958 | Colburn et al. | 226/187 X |
| 3,101,913 | 8/1963 | Davis | 226/187 X |
| 3,120,794 | 2/1964 | Gold | 271/272 |
| 3,132,785 | 5/1964 | Kunz | 226/183 X |
| 3,428,308 | 2/1969 | Bernard | 271/273 |
| 3,545,371 | 12/1970 | Reist | 271/273 |
| 3,559,861 | 2/1971 | Knox | 226/187 X |
| 3,964,657 | 6/1976 | Lenk et al. | 226/187 X |
| 4,043,779 | 8/1977 | Schaefer | 65/2 |
| 4,089,378 | 5/1978 | Suzuki | 271/272 X |
| 4,502,804 | 3/1985 | Willcox | 271/272 X |

*Primary Examiner*—C. D. Crowder
*Assistant Examiner*—Tina R. Taylor
*Attorney, Agent, or Firm*—Ostrolenk, Faber, Gerb & Soffen, LLP

[57] ABSTRACT

Apparatus for feeding one or more fiber threads, e.g., of glass, at an adjustable feeding rate. At least two synchronously driven feed rollers forming at least one nip for the fiber thread and consisting of a first motor driven roller and a second co-rotating roller. The motor driven roller and/or the co-rotating roller are/is provided with one or more, each in its respective peripheral slot in the cylindrical mantle surface of the roller housed O-ring of an elastic incompressible material, e.g., rubber. The O-ring bears on the peripheral surface of the adjacent roller to transmit the rotary motion by means of friction.

8 Claims, 1 Drawing Sheet

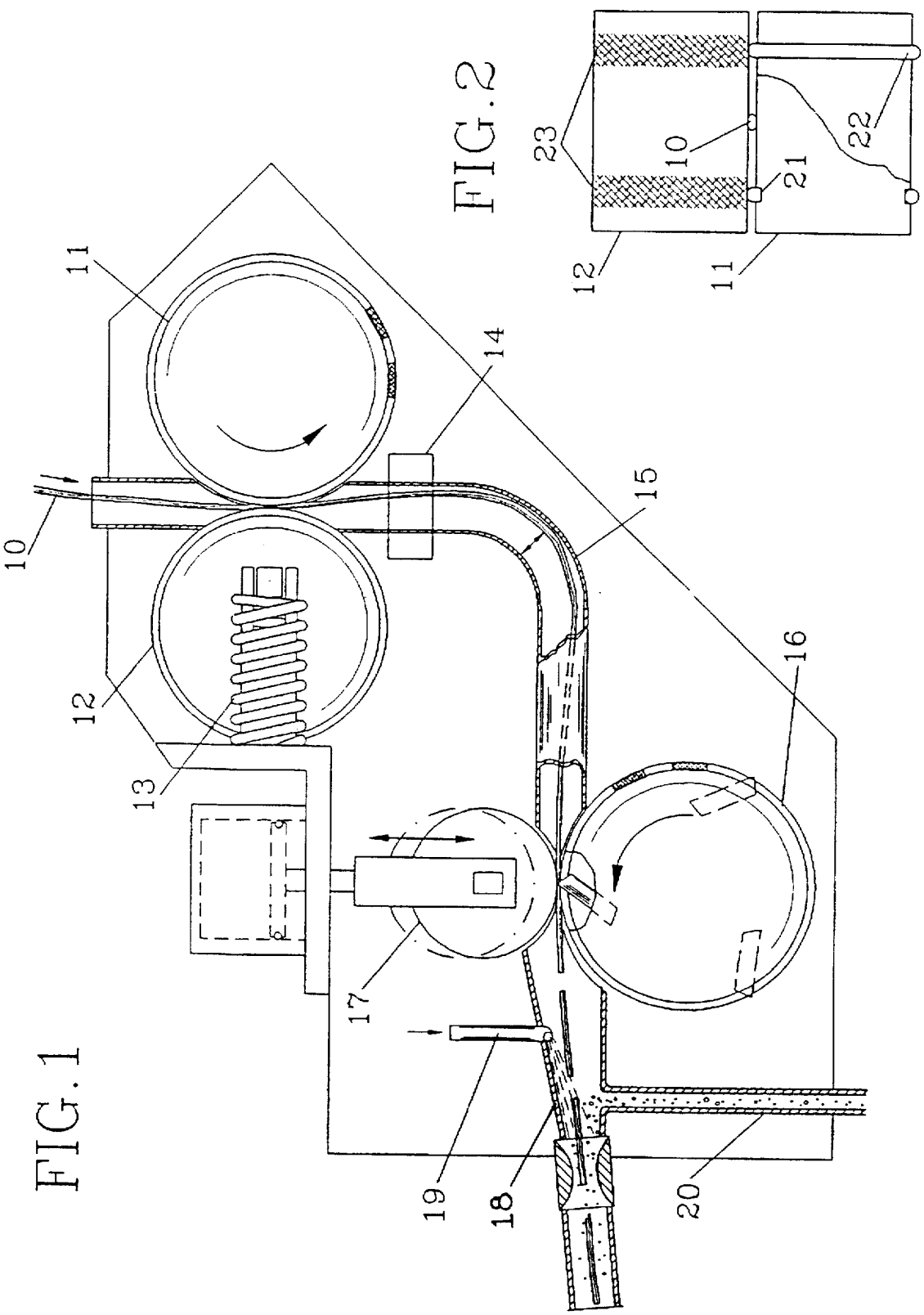

5,775,565

APPARATUS FOR FEEDING ONE OR MORE FIBRE THREADS

TECHNICAL FIELD

The present invention refers to an apparatus for feeding one or more fibre threads, e.g. of glass, at an adjustable feeding rate, comprising at least two synchronously driven feed rollers forming at least one nip for the fibre thread and consisting of a first motor driven roller and a second co-rotating roller.

BACKGROUND OF THE INVENTION

In robot-controlled production, there are usually a high demand for precision in the delivery of raw material. For example, when feeding fiber thread to a robot-controlled fiber feeding apparatus, the feeding rate may be about 10 meters per second, wherein the quality of the product is highly dependent upon an exact control of the feeding. A prerequisite for such an exact control is that the feed rollers are synchronously driven at the right speed, without damages to the thread. Damages may occur if a thread which is composed of a large number of single thin threads is subjected to wear, e.g. because the feeding rollers are not driven synchronously, so that one side of the fiber is either braked or subjected to wear. This can lead to a negative influence upon the strength of the thread, and that a part of the thread is worn away, so that the required amount of material is not supplied to the robot.

The feeding rollers, of which one thus is mechanically operated and the other is only co-rotating, can be driven synchronously in different ways. For example, gearwheels, a chain transmission or a toothed belt can be used for synchronisation of the feeding rollers. However, all these known transmissions exhibit drawbacks in an environment which is subjected to comparatively large amounts of fine fiber dust from the thread.

Also, it is advantageous if the feeding rollers and their driving means can be housed in a manner which requires little space and reduces the weight, to facilitate mounting upon a robot arm.

It is also important that the driving of the feeding rollers is reliable, with little need for attention and maintenance.

THE TECHNICAL PROBLEM

One object of the present invention is therefore to provide a device for feeding fiber thread, which fulfills the above discussed prerequisites.

THE SOLUTION

For this purpose the invention is characterized in that the motor driven roller and/or the co-rotating roller are/is provided with one or more, housed O-ring of an elastic incompressible material, e.g. rubber, each in its respective peripheral slot in the cylindrical mantle surface of the roller which O-ring bears on the peripheral surface of the adjacent roller to transmit the rotary motion by means of friction.

Preferably, the contact surface of the co-rotating roller toward the O-ring/rings is provided with a friction enhancing knurling.

DESCRIPTION OF THE DRAWINGS

The invention will be described here below with reference to an embodiment shown in the accompanying drawing, in which FIG. 1 shows schematically a feeding apparatus in a side view, and FIG. 2 shows the feeding rollers in view from above.

DESCRIPTION OF EMBODIMENTS

The feeding apparatus schematically shown in FIG. 1 is used mounted upon a not shown robot arm, for feeding out fiber thread 10 and binding agent in the form of powder from not shown magazines, for example to molds for plastic products.

Preferably, the robot arm is freely movable in the room and is governed by a micro processor, which can be programmed.

The fiber thread 10 is drawn from its magazine into the feeding apparatus by means of two feeding rollers 11, 12, which form a nip for the fiber thread and comprise a first motor driven roller 11 and a second co-rotating roller 12.

The roller 12 has a displaceable bearing which is pressed in the direction towards the roller 11 by means of a compression spring 13. The roller 11 is driven in a speed adjustable manner by means of a not shown driving motor.

The rollers 11, 12 feed the fiber thread 10 forward via a compressed air ejector 14 and a tube 15, which is bent to about 90° and emerges into the nip between a knife roller 16 and a support roller 17.

The fiber thread pieces cut by the knife roller 16 are blown out through an ejector pipe 18 which is provided with a connection 19 for compressed air. Also, the ejector pipe 18 is provided with a connection 20 to a conduit for supply of a pulverulent bonding agent.

The motor driven roller 11 is provided with two housed O-rings 22 of an elastic incompressible material, e.g. rubber, each ring in a respective slot 21 in the cylindrical mantle surface of the roller. The O-rings bear on the peripheral surface of the adjacent roller 12 and transmit the rotary motion to said roller by means of friction, so that the rotation of both rollers is synchronized.

The surface of the roller 12 is provided with a knurling 23 to enhance friction between the O-rings 22 and the roller 12.

The invention is not limited to the embodiments described here above, but several variants are conceivable within the scope of the following claims. For example, both the rollers 11, 12 may be provided with O-rings, in order to increase the contact surface.

I claim:

1. Apparatus for feeding at least one fiber thread at an adjustable feed rate, the apparatus comprising:

at least two synchronously driven feed rollers each having a cylindrical mantle surface, the rollers being so positioned adjacent each other that their mantle surfaces form a nip between the two feed rollers for the fiber thread;

one of the rollers being supported for being motor driven and the other roller being supported for being a co-rotating roller for co-rotating with the motor driven roller;

the surface of at least one of the motor driven roller and the co-rotating roller having a peripheral slot in the surface, an O-ring of an elastic incompressible material being supported in the slot, the slot in the surface of the one roller and the O-ring therein being shaped so that the O-ring bears on the mantle surface of the other of the motor driven roller and co-rotating roller to transmit the rotary motion between the driven and co-rotating rollers by means of friction transmitted through the O-ring.

2. The apparatus of claim 1, wherein the other of the motor driven and co-rotating rollers that is not supporting the O-ring has a friction enhancing surface region on the mantle surface placed so that the surface region of the other roller contacts the O-ring.

3. The apparatus of claim 2, where the friction enhancing surface region comprises knurling of the respective surface.

4. The apparatus of claim 1, further comprising an ejector for fiber threads located downstream of the driving and co-rotating rollers along the path of the fiber threads beyond the driven and co-rotating rollers.

5. The apparatus of claim 1, further comprising two of the peripheral slots formed in at least one of the mantle surfaces of the driven roller and the co-rotating roller, a respective one of the O-rings in each of the slots, whereby two of the O-rings pass through the nip between the driven and co-rotating rollers; the slots and O-rings being spaced apart along the roller axes.

6. The apparatus of claim 5, wherein there is a region along the rollers through which the fiber threads pass through the nip; and the O-rings are disposed along the rollers at opposite sides of the region between the rollers.

7. The apparatus of claim 6, wherein both slots are formed in the mantle surface of one of the rollers.

8. The apparatus of claim 7, further comprising a respective friction enhancing surface region on the other of the rollers opposite each of the O-rings for being engaged by the O-rings to transmit the rotary motion by friction.

* * * * *